XR 3,835,249

United States Patent [19]

Dattilo et al.

[11] 3,835,249

[45] Sept. 10, 1974

[54] SCANNING LIGHT SYNCHRONIZATION SYSTEM

[75] Inventors: Anthony J. Dattilo; Donald W. Zegafuse, Jr., both of Lexington, Ky.

[73] Assignee: International Business Machines Corporation, Armonk, N.Y.

[22] Filed: Dec. 26, 1972

[21] Appl. No.: 317,976

[52] U.S. Cl. .................. 178/7.6, 178/6, 178/69.5 F
[51] Int. Cl. .................. H04n 3/08
[58] Field of Search .................. 178/6, 7.6

[56] References Cited

UNITED STATES PATENTS

| | | | |
|---|---|---|---|
| 1,859,020 | 5/1932 | Brown | 324/96 |
| 3,426,144 | 2/1969 | Roth | 178/6.6 |
| 3,441,949 | 3/1969 | Rolon | 346/108 |
| 3,549,800 | 12/1970 | Baker | 178/7.3 |
| 3,553,438 | 1/1971 | Blitz | 235/61.11 |
| 3,561,846 | 2/1971 | Kingsland | 250/219 |
| 3,574,469 | 4/1971 | Emerson | 356/200 |
| 3,584,144 | 6/1971 | Shepard | 178/7.1 |
| 3,750,189 | 7/1973 | Fleischer | 346/74 |

*Primary Examiner*—Howard W. Britton
*Assistant Examiner*—Edward L. Coles
*Attorney, Agent, or Firm*—John W. Girvin, Jr.

[57] ABSTRACT

A scanning light synchronization system generates a real time clock, the output signal of which indicates the precise position of a scanning light beam. A collimated light beam is diverted by a multi-faceted rotating mirror in a scanning direction. The scanning light beam is split along two paths by a light diverter: a utilization path and a synchronization path. That portion of the light beam traversing the synchronization path scans an optical grating. That portion of the light beam passing through the grating is thereafter reflected from the surface of an elliptical mirror to a light detection device. The elliptical mirror is positioned so that its first optical foci is located at the diversion point of the scanning mirror and its second optical foci is located at the light detector. The light detector provides an output signal indicating the real time position of the scanning beam traversing the utilization path. This output signal is utilized with stored information to modulate the scanning beam so that the light beam traversing the utilization path creates an image on a light receptive surface. The output of the light detection device is also utilized in conjunction with light reflected from a document surface placed in the utilization path to effect the clocking of information signals obtained from such reflected light.

12 Claims, 9 Drawing Figures

3835249
NO OR CLASSIF

SCANNING LIGHT SYNCHRONIZATION SYSTEM

CROSS-REFERENCE TO RELATED APPLICATIONS

The following application is assigned to the same assignee as the present application:

U.S. Pat. No. 3,750,189 issued July 31, 1973, entitled "Improved Light Scanning and Printing System," John Martin Fleischer, inventor, filed Oct. 18, 1971.

BRIEF BACKGROUND OF INVENTION

1. Field

This invention relates to optical light scanning devices in general and, more particularly, to a synchronization device for precisely locating the position of a scanning light beam.

2. Description of the Prior Art

Optical scanning systems are utilized for a variety of well known functions, such as optical printing, optical character recognition, and facsimile recording and generation. The prior devices have utilized a laser light source to generate a collimated light beam in conjunction with a rotating mirror utilized to effect scanning motion of the light beam. Such a scanning system is described in the aforereferenced co-pending application of Fleischer.

When a scanning beam has been utilized to generate or to detect data information, a precise clocking circuit has been utilized in conjunction therewith to modulate the data generating beam or to gate data information obtained with the scanning beam. Generally, the clocking circuit is synchronized at the start of a line scan. The utilization of such a system to produce a relatively distortionless output is then necessarily dependent upon the preciseness of the generated clock and also upon the preciseness of the scanning beam. That is, the deflection of the scanning beam as effected by each facet of the rotating scanning mirror must uniformly traverse the surface being scanned and the clock must provide a uniform output. Such prior systems thus necessitate the utilization of precise clocking circuits and precise optical option components.

Various prior optical systems have proposed the splitting of the main light beam along two paths. Light traversing a first path is utilized for the system function and light traversing the second path is utilized for synchronization purposes. When such a system has been utilized in the past, the main beam has been split prior to imparting scanning motion thereto. Thus, the degree of synchronization achieved with such prior systems is dependent upon the precision of the optical components utilized to generate the scan. Further, it has been necessary to provide appropriate collection lenses to properly collect the light traversing the second path so that it can be sensed by a light sensitive device. Such collection lenses must be relatively free of distortion in order to provide precise synchronization output signals. Such precise optical elements are, of course, expensive.

SUMMARY

In order to overcome the above noted shortcomings of the prior art and to provide a light scanning synchronization system for generating a real time synchronization signal for utilization with a scanning beam, the apparatus of the present invention includes means for splitting the main scanning beam so that a portion of the scanning beam traverses a synchronization path. The beam traversing the synchronization path passes through an optical grating prior to impinging upon a light detection device. An optical system having a first and second optical foci is placed in the synchronization path so that one foci thereof is located at the divergence point of the scanning beam. The light detection device is located at the second foci of the optical system and thus receives the light therefrom. Since the light passes through an optical grating before impinging on the light sensitive device, the light beam is intensity modulated in accordance with the positional location of the beam within a scan. Since the position of the light beam traversing the synchronization path is optically related to the position of the light beam traversing a utilization path, the output signal of the light detector can be utilized to precisely locate the position of the scanning beam during scanning. If the scanning beam is being utilized for recording purposes, the output signal from the output detector may be utilized to clock information into the light beam which is modulated with such an information signal. If the light beam is being utilized to scan a document, the clocking signal can be utilized to clock information from the document.

The location of the optical system and the beam splitter within the system lessens the need for precise optical aligning equipment to insure proper scanning synchronization.

Accordingly, it is the principle object of the invention to provide an improved light scanning synchronization system for synchronizing a scanning beam on a real time basis.

A still further object of this invention is to provide a light scanning synchronization system for synchronizing the recording of information onto a light receptive surface.

A still further object of this invention is to provide a light scanning synchronization system for synchronizing the detection of optically recorded data.

The foregoing objects, features, and advantages of the invention will be apparent from the following more particular description of the preferred embodiments of the invention as illustrated in the accompanying drawings.

IN THE DRAWINGS

DESCRIPTION

Figures 1, 2:
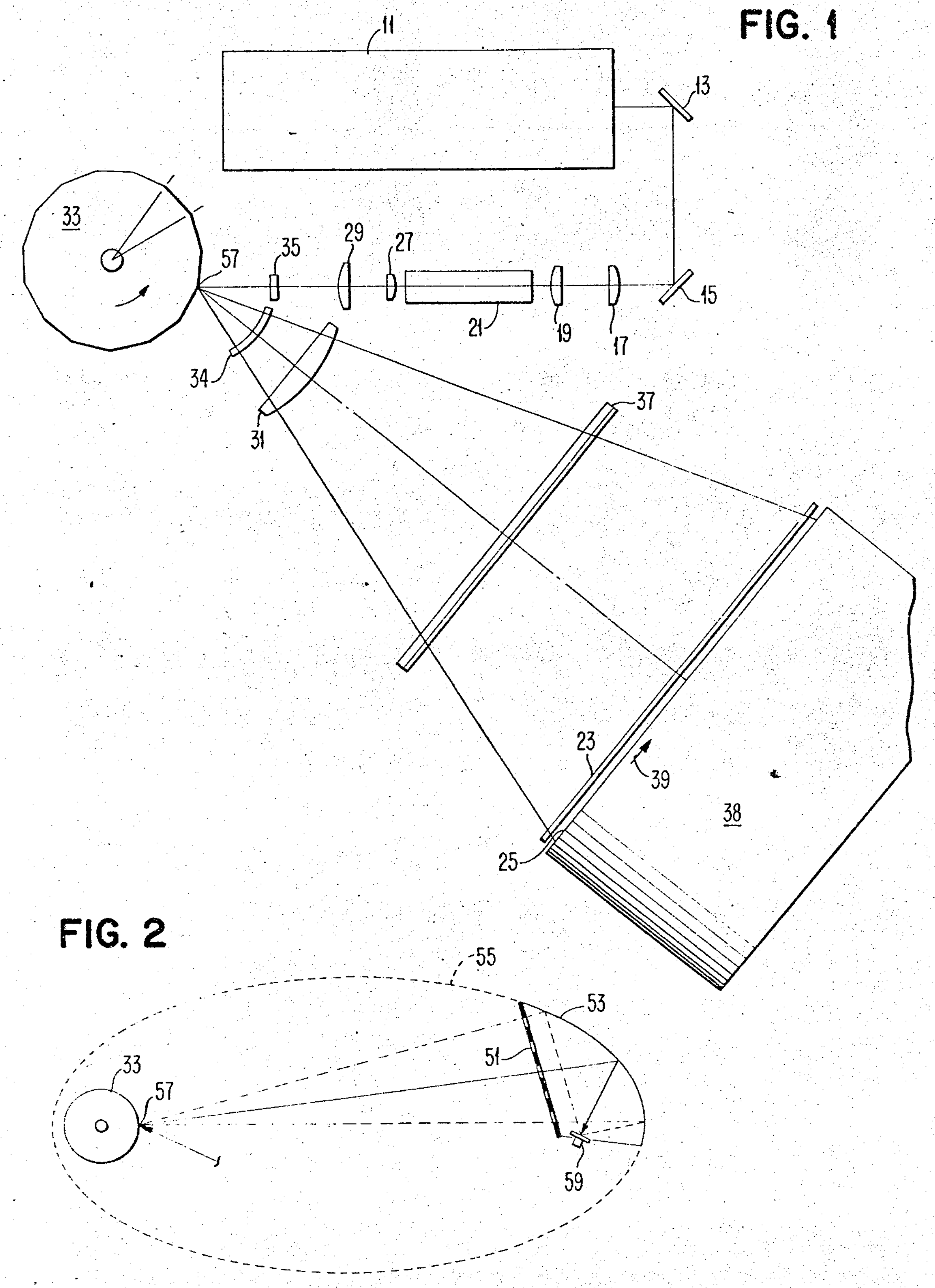
FIG. 1 is a schematic diagram of the optical components utilized to generate a scanning light beam.
FIG. 2 is a schematic diagram of an optical system utilized to generate a synchronization signal.

Referring now to the drawings, and more particularly to FIG. 1 thereof, the schematic diagram of the optical components utilized to generate a scanning light beam is depicted.

A light source 11 such as a low powered laser produces a beam of coherent collimated light which is incident upon the planar mirror 13. The beam of light is reflected from planar mirror 13 to planar mirror 15 from whence it is reflected to lenses 17 and 19.

Lenses 17 and 19 act as a beam compressor, the focal lengths of the lenses being chosen to give the required beam diameter at the modulator 21. The modulator 21 may be any one of a number of well known modulator means, such as an acousto-optic modulator, an electro-optic modulator, or other modulator means known in the art. The modulator is set up so that the zero order causes the light beam to be incident onto the knife edge 23 located adjacent the recording surface 25 and so that the first order causes the light beam to be incident on the recording surface 25. Therefore, the light beam is directed either onto the knife edge 23 which blocks the beam or onto the recording surface 25 by switching the driver of the modulator 21.

After the light beam has been deflected by the modulator 21, it is expanded. Lenses 27 and 29 act as a beam expander. The output beam diameter is determined by the spot size of the beam required at lens 31. Since lens 31 is operated in the defraction limited mode to generate the spot on the recording surface 25, increasing the beam diameter out of the beam expander will result in a smaller spot at the recording surface 25. The ratio of the required input and output diameters of the beam determine the focal lengths of lenses 27 and 29.

A rotating multi-faceted mirror 33 is utilized to sweep the light beam across the width of the recording surface 25. The number of facets on this mirror and the rotational velocity of the mirror determine the time for a beam scan. These parameters along with the processing speed of the recording surface 25 are chosen so that the recording surface advances the width of one picture element during a scan time.

Two cylindrical lenses 34 and 35 are used in conjunction with the multi-faceted mirror 33. These lenses reduce the tolerance on the declination angle of the rotating mirror.

As noted heretofore, lens 31 is a projection lens utilized to generate a defraction limited spot on the recording surface 25. It also operates in conjunction with the cylindrical lens elements to reduce declination tolerance. The focal length of lens 31 is determined by the scan angle and the width of the recording surface 25.

A beam splitter 37 is located between lens 31 and the knife edge 23. A portion of the scanning beam passes through the beam splitter along the utilization scanning path to the knife edge 23 or to the recording surface 25 in accordance with the state of the modulator 21. A portion of the scanning beam is reflected from the beam splitter 37 along a synchronization scanning path to be described. The beam splitter consists of a partially silvered mirror with an anti-reflection coating on the back side thereof.

The recording surface 25 can comprise any well known light responsive surface. In the preferred embodiment, the recording surface 25 is a photoconductive recording surface of a rotating drum 38. A suitable photoconductive material for the recording surface is disclosed in U.S. Pat. No. 3,484,237, issued Dec. 16, 1969. The photoconductive material is mounted over a conductive substrate such as an insulating material sprayed with aluminum.

The rotating drum 38 may be incorporated as a portion of an electrostatic reproducing apparatus per se well known in the art. When utilizing such reproducing apparatus, a uniform electrostatic charge is firstly imposed on the photoconductive recording material by a device such as a corona discharge device. A light beam thereafter impinging upon the surface of the photoconductive material discharges the electrostatic charge at the impingement point. Accordingly, modulation of the light beam effected by modulator 21 as the light beam scans across the photoconductive material in the direction of arrow 39 creates a scan line having an electrostatic pattern on the recording surface 25. A plurality of such scan lines produce an image which may be subsequently developed with electrostatic toner to produce a visible image. The toned image may thereafter be transferred to a support substrate such as paper in the well known manner.

A more detailed description of the optical components described with respect to FIG. 1 with the exception of the beam splitter 37 appears in the afore referenced co-pending application of Fleischner, incorporated by reference herein.

In order to properly synchronize the modulation of the light beam in accordance with the position of the light beam within a scan line, a portion of the light beam is reflected by the beam splitter 37 along a synchronization scanning path. Referring now to FIG. 2 of the drawings, a schematic diagram of an optical system utilized to generate a synchronization signal is depicted. For purposes of simplification, the light path is depicted in an unfolded state, the reflection path created by the beam splitter 37 of FIG. 1 being eliminated.

That portion of the light beam reflected by the beam splitter 37 of FIG. 1 passes from the rotating multi-faceted mirror 33 through an optical grating 51 to intersect with an elliptical shaped mirror 53. The optical grating is placed so that beam deflection effected by the modulator 21 causes the beam traversing the synchronization scanning path to be deflected in a direction parallel to the optical grating lines. The elliptical mirror is constructed by cutting a desired section of an ellipse from an aluminum plate. The entire ellipse is depicted by the broken line 55. The ellipse thus depicted has two foci, the first foci being located at the diversion point 57 of the multi-faceted mirror 33. A light responsive device 59 is located at the second foci of the ellipse. Accordingly, light emanating from the diversion point 57 is reflected by the elliptical mirror 53 to the light responsive device 59. Since the light "scans" the optical grating 51 prior to striking the elliptical mirror 53, the light received at the light responsive device 59 is intensity modulated in accordance with the position of the light beam with respect to the optical grating 51. The light incident on the light responsive device 59 is thus intensity modulated in accordance with the position of the light beam in its scanning path. The output signal of the light responsive device can therefore be utilized to precisely identify the location of the light beam within the scan.

Figure 3:
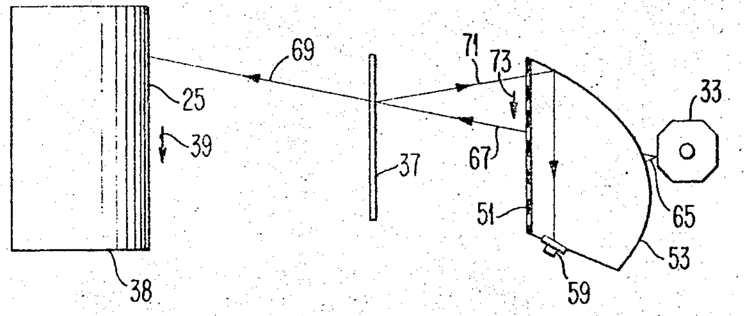
FIG. 3 is a top schematic view of a folded optical system depicting a scanning light path and a synchronization light path.

Referring now to FIG. 3 of the drawings, a top schematic view of a folded optical system depicting a scanning light path and a synchronization light path is shown. A light beam 65 generated from the laser source depicted in FIG. 1 impinges upon the rotating multi-faceted mirror 33 causing a reflected light beam 67 to be positioned along a scanning path in accordance with the rotational position of the multi-faceted mirror 33. The reflected light beam 67 is intercepted by the beam splitter 37 which reflects approximately 25 percent of the light beam and allows approximately 75 percent of the light beam to pass therethrough. The beam splitter 37 is positioned so that the optical line grating 51 and the recording surface 25 are the same distance from the beam splitter. The light beam 69 passing through the beam splitter 37 strikes the recording surface 25 of the rotating drum 38 and procedes along a utilization scanning path in the direction of arrow 39.

Figure 4:
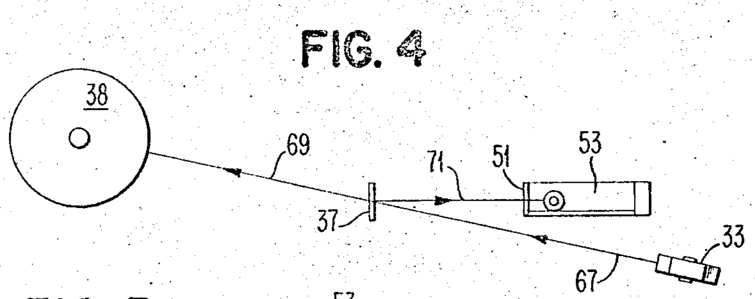
FIG. 4 is a side schematic view of the optical system depicted in FIG. 3.

The light beam 71 reflected by the beam splitter 37 is incident upon the surface of the optical grating 51 and scans along a synchronization scan path in the direction of arrow 73. Light passing through the optical grating 51 is incident upon the elliptical mirror 53 which reflects such light to the light responsive device 59. FIG. 4 depicts a side schematic view of the optical system depicted in FIG. 3.

Figure 5:
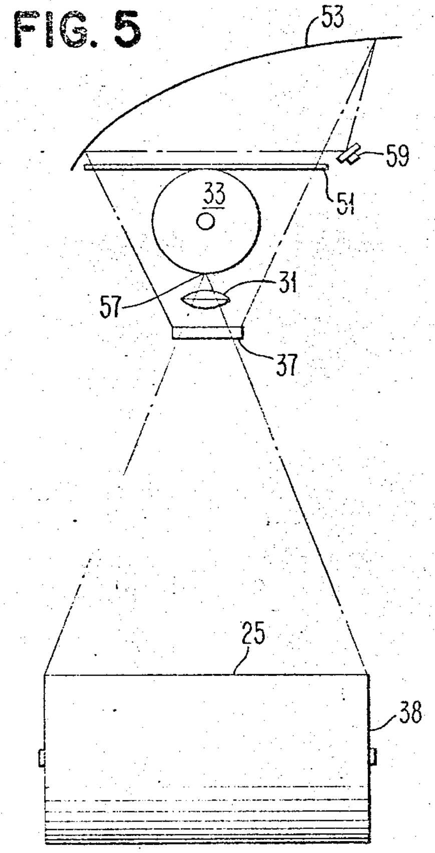
FIG. 5 is a top schematic view of an alternate arrangement of optical components for passing light along a scanning path and a synchronization path.
Figure 6:
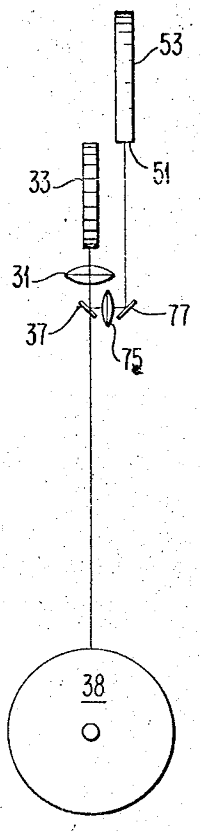
FIG. 6 is a side schematic view of the optical components depicted in FIG. 5.

Referring now to FIGS. 5 and 6 of the drawings, top and side schematic views, respectively, are depicted of an alternate arrangement of optical components for passing light along a scanning path and a synchronization path. The generation of the scanning beam, the splitting thereof along a utilization scanning path and a synchronization scanning path, and the utilization of the beam traversing the utilization scanning path for data recording is the same as that previously described with respect to FIGS. 1–4 of the drawings. However, an additional lens 75 and mirror 77 are utilized in the synchronization scanning path. The lens 75 condenses the length of the scan along the optical grating 51 thereby reducing the physical length of the optical grating. Such a physical size reduction of the grating is desirable when the scanning system is utilized to scan the length of a document in contradistinction to its width. The mirror 77 directs the beam toward the grating 51 and elliptical mirror 53. It is noted that while lens 75 reduces the physical distance of the synchronization path, the diversion point 57 is still located at the optical focus of the elliptical mirror 53.

Figure 7:
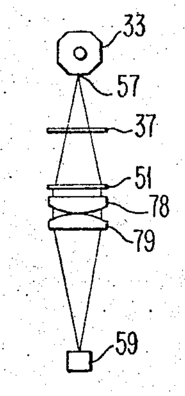
FIG. 7 is a schematic diagram of an alternate optical system utilized to generate a synchronization signal.

Referring now to FIG. 7 of the drawings, a schematic diagram of an alternate optical system utilized to generate a synchronization signal is depicted. The scanning light beam eminating at the multi-faceted rotating mirror 33 passes through the beam splitter 37 and optical grating 51 as previously described. Thereafter, the beam passes through two elliptical aspheric lenses 78 and 79 from which it is directed onto the light detection device 59. The divergence point 57 is located at one focus point of the lens system and the light detection device is located at the second focus point. The utilization of elliptical lenses reduces spherical aberration present with cylindrical lenses thereby reducing the target size of the light responsive device 59.

Figure 8:
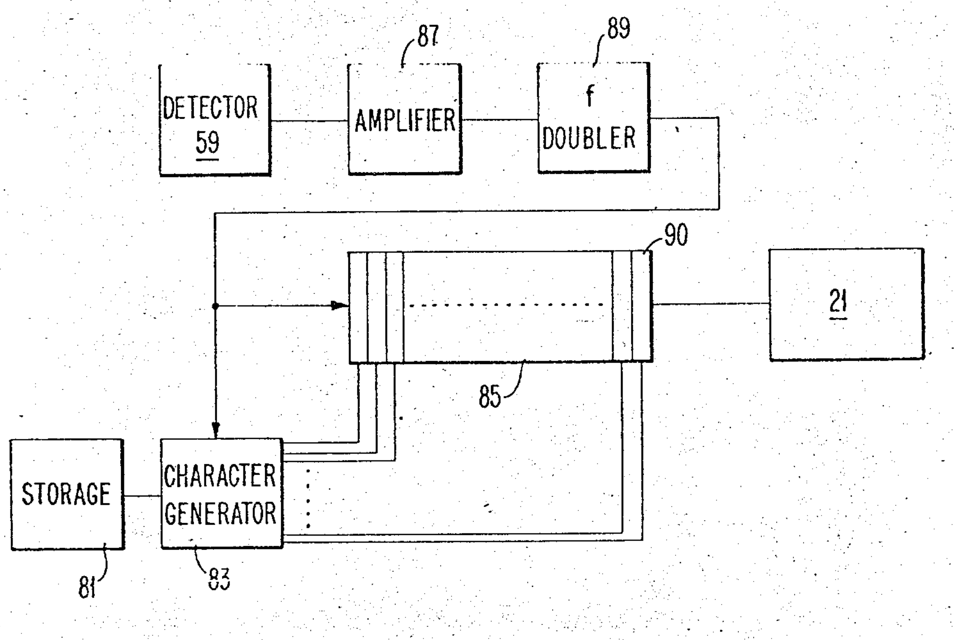
FIG. 8 is a schematic circuit diagram of a data recording system.

Referring now to FIG. 8 of the drawings, a schematic circuit diagram of a data recording system is depicted. The circuit incorporates the light responsive device 59 and the modulator 21 of FIG. 1. Data information located in conventional storage device 81 is broken into a series of blank and unblank signals by the character generator 83. The character generator 83 is responsive to digital information stored in the storage unit 81 to create a character representation, a scan line at a time. Conventional decode circuits are utilized for such scan line generation.

The output signals of the character generator are gated in parallel thereform to a serializer shift register 85. The information in the serializer shift register 85 is sequentially gated therefrom to control the modulation of the scanning light beam. That is, once the character generator provides the output signals to the serializer shift register 85, the information contained therein is sequentially gated out to the control unit of the modulator 21 which effects beam deflection. The sequential gating control for the shift register is derived from the signal output of the light responsive device 59. This signal output is amplified, limited and clipped by the amplifier 87 and the output signal thereof is doubled by the frequency doubler 89. The utilization of the frequency doubler 89 facilitates wider spacing of the lines along the optical grating 51 of FIG. 6. It is not utilized when the optical line grating has the same resolution as the printing resolution.

The output signal from the frequency doubler 89 causes the information bit located in the last position 90 of the serializer shift register 85 to be shifted therefrom to the modulator 21 and causes each subsequent bit in the register to be shifted by one position to the right. The output signal from the shift register controls the modulator 21 which in turn causes beam deflection in accordance with the information signal of the bit shifted from the shift register.

Figure 9:
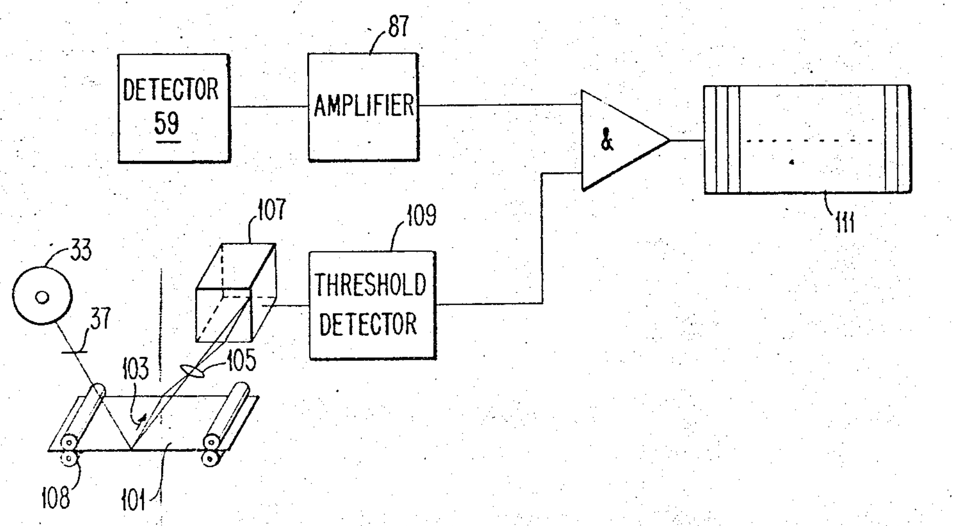
FIG. 9 is a schematic circuit and pictorial diagram of data detection systems.

Referring now to FIG. 9 of the drawings, a schematic circuit and pictorial diagram of a data detection system is depicted. The data detection system is utilized in conjunction with a scanning light beam which is generated in a manner similar to that described with respect to FIG. 1 and in conjunction with optical components utilized to generate a synchronization signal similar to those described with respect to FIGS. 2–4. However, it should be noted that the system utilized to generate the scanning light beam does not necessarily include the modulator 21 or the condensation optics associated therewith, since it is desirious to generate a continuous scanning beam across the surface 101 being scanned.

A scanning light beam is thus generated by rotating multi-faceted mirror 33 and passes through a beam splitter 37 as heretofore described. Light passing through the beam splitter traverses a utilization scanning path along the surface 101 in the direction of arrow 103 in accordance with the movement of the rotating multi-faceted mirror 33. The surface 101 has information such as printed information located along the surface thereof. The light beam which is reflected from the surface 101 varies in intensity in accordance with the information content at the point of impingement. The reflected light beam is collected by collecting lens 105 and thereafter impinges on the surface of a light detection device 107. The output signal from the light detection device is passed through a threshhold detector 109 which provides a binary output signal in accordance with the intensity of the light striking the light detection device 107. The surface 101 is moved in a direction orthogonal to the scanning direction by drive roll 108 to effect the generation of multiple scan lines of information.

That portion of the scanning beam which is reflected by the beam splitter 37 passes through an optical grid onto the surface of a light detection device 59 as heretofore described with respect to FIGS. 1–4 of the drawings. The output signal of the light detection device 59 is amplified, limited and clipped by the amplifier 87, the output signal of which is utilized to gate the binary signal output of the threshhold detector 109 into shift register 111. That is, amplifier 87 provides a gating pulse in accordance with the resolution pattern of the optical grating which is utilized to gate the output signal of the threshhold detector 109 into the shift register 111. Each such sample pulse or gating pulse causes a new data bit to be stored in the shift register 111 until the shift register 111 contains a plurality of data bits representative of a complete scan line.

DETAILED EMBODIMENT

The following is a description of various optical components utilized in the schematic diagrams of FIGS. 1–4.

| COMPONENT | DESCRIPTION |
|---|---|
| light source 11 | 5 mw He Ne Laser .65 mm $\phi$, 1.7 mr Div. |
| planar mirrors 13, 15 | Front Surface Mirror 25 mm × 25 mm |
| lens 17 | Plano-Convex Lens 25 mm FL, 12 mm $\phi$ |
| lens 19 | Plano-Convex Lens 10 mm FL, 8 mm $\phi$ |
| modulator | Acousto-Optic Deflector, Zenith M40R |
| lens 27 | Plano-Convex Lens 8 mm FL, 4 mm $\phi$ |
| lens 29 | Plano-Convex Lens 38.1 mm FL, 20 mm $\phi$ |
| lens 35 | Cylindrical Plano-Convex Lens 80 mm FL, 25 mm Lg. |
| mirror 33 | Rotating Mirror 15 Facets, facet angle 24°, scan angle 18°, 3552 rpm drive, diameter 1.401 inches. |
| lens 34 | Torodial Plano-Convex Lens 43 mm FL, 45° Arc |
| lens 31 | Plano-Convex Lens 352 mm FL, 30 mm × 80 mm |
| beam splitter 37 | Beamsplitter ¾ inch × 6⅜ inch |
| optical line grating | Grating 4 mil × 4 mil Lines ½ inch high |
| light detection device | PIN 10 Diode, ⅜ inch diameter light receptive surface |
| resolution | 240 scans/inch |
| unblank time | $3.91 \times 10^{-4}$ seconds |
| processing speed of recording surface 25 | 3.60 inches/sec |

The above description assumes a light beam having a round cross-section. In some systems, an elliptical spot may be more desirable. The vertical dimension of the elliptical spot is determined in accordance with the overlap tolerance necessary to assure uniform light distribution between scan lines on the recording surface 25. The horizontal dimension is reduced to improve the synchronization output signal amplitude.

Referring once again to FIG. 1 of the drawings, a rotating multi-faceted mirror 33 has been described for causing the light beam to be diverted through scanning and synchronization paths. As is appreciated by those skilled in the art, various other deflection mechanisms including rotating prisms or the like could also be utilized. Additionally, various other light sources and light modulation techniques could be utilized in accordance with the speed requirements of the system. Further, the scanning light beam could be utilized for both data recording and data scanning applications within the same machine environment by incorporating a positionable reflective surface between the beam splitter 37 and the recording surface 25 of FIG. 1 adapted to move to a position to deflect the main scanning beam to scan a surface such as surface 101 of FIG. 8.

While the foregoing invention has been particularly shown and described with reference to preferred embodiments thereof, it should be understood by those skilled in the art that the foregoing and other changes in form and detail may be made therein without departing from the spirit and scope of the invention.

What is claimed is:

1. A light scanning synchronization system comprising:

a light source for generating a collimated light beam which traverses a first path;

a light diverter positioned along the first path movable for diverting the light beam incident thereon from a diversion point along a scanning path;

beam splitting means positioned along the scanning path for diverting the light beam along a utilization scanning path and a synchronization scanning path;

a surface to be scanned positioned to intercept said light beam along said utilization scanning path, movement of the light diverter positioning the light beam to scan said surface;

an optical system having first and second optical foci and positioned to intercept said light beam along said synchronization scanning path, said first optical foci being located at the diversion point of the light diverter;

a light responsive device located at the second optical foci and responsive to light incident thereon for providing an output signal proportional to the light intensity incident thereon;

an optical grating located intermediate said beam splitting means and said light responsive device and positioned to intercept said light beam traversing said synchronization scanning path for intensity modulating the light beam in accordance with the position of the light beam along said synchronization scanning path;

a data register containing at least one information bit and responsive to the output signal of the light responsive device for gating said at least one information signal therefrom;

a light modulator responsive to said data register for modulating said columniated light beam in accordance with the information content of said information bit.

2. The light scanning synchronization system set forth in claim 1 wherein said light diverter comprises a multifaceted rotating mirror and wherein said first foci is located at the surface of said rotating mirror.

3. The light scanning synchronization system set forth in claim 1 wherein said data register contains a plurality of information bits and wherein said output synchronization signal sequentially gates said information bits from said register.

4. The light scanning synchronization system set forth in claim 3 wherein said light modulator deflects said columniated light beam in accordance with the information content of the signal gated from said data register and further including light blocking means located intermediate said beam splitting means and said surface to be scanned for blocking said light beam traveling along said utilization scanning path when said modulator deflects said light beam to a first position and positioned in non-blocking relationship with said light beam traversing said utilization scanning path when said modulator deflects said light beam to a second position.

5. The light scanning synchronization system set forth in claim 4 further including moving means for moving said surface to be scanned in a direction orthogonal to the utilization scanning path.

6. The light scanning synchronization system set forth in claim 1 wherein said optical system comprises an elliptical reflector and wherein said light responsive device being located at an optical foci of the elliptical reflector and responsive to light reflected therefrom.

7. The light scanning synchronization system set forth in claim 6 wherein said optical grating is located intermediate said beam splitting means and said elliptical reflector.

8. A light scanning synchronization system comprising:

a light source for generating a columniated light beam which traverses a first path;

a light diverter positioned along the first path movable for diverting the light beam incident thereon from a diversion point along a scanning path;

beam splitting means positioned along the scanning path for diverting the light beam along a utilization scanning path and a synchronization scanning path;

a surface to be scanned positioned to intercept said light beam along said utilization scanning path, movement of the light diverter positioning the light beam to scan said surface;

light responsive means responsive to light reflected from said surface for providing an output information signal;

a threshhold detector responsive to the output information signal of said light responsive means for providing a binary output signal;

an optical system having first and second foci and positioned to intercept said light beam traversing said synchronization scanning path, said first foci being located at the diversion point of the light diverter;

a light responsive device located at the second foci and responsive to light incident thereon for providing an output signal proportional to the light intensity incident thereon;

an optical grating located intermediate said beam splitting means and said light responsive device and positioned to intercept said light beam traversing said synchronization scanning path for intensity modulating the light beam in accordance with the position of the light beam along said synchronization scanning path;

a data register responsive to the binary output signal of said threshhold detector into the output signal of the light responsive device for storing a binary bit of information in accordance with the binary significance of the binary output signal of the threshhold detector at a time determined by the output signal of the light responsive device.

9. The light scanning synchronization system set forth in claim 8 wherein said light diverter comprises a multifaceted rotating mirror and wherein said first foci is located at the surface of said rotating mirror.

10. The light scanning synchronization system set forth in claim 8 further including moving means for moving said surface to be scanned in a direction orthogonal to the utilization scanning path.

11. The light scanning synchronization system set forth in claim 8 wherein said optical system comprises an elliptical reflector and wherein said light responsive device being located at an optical foci of the elliptical reflector and responsive to light reflected therefrom.

12. The light scanning synchronization system set forth in claim 11 wherein said optical grating is located intermediate said beam splitting means and said elliptical reflector.

* * * * *